United States Patent [19]

De Filippi

[11] Patent Number: 5,209,015
[45] Date of Patent: May 11, 1993

[54] MOISTENING DEVICE FOR FLOWER POT STANDS AND/OR THE LIKE

[76] Inventor: Felipe De Filippi, Junin 1349, 2nd Floor "G", Buenos Aires, Argentina

[21] Appl. No.: 728,744

[22] Filed: Jul. 12, 1991

[30] Foreign Application Priority Data

Jul. 19, 1990 [AR] Argentina .................... 317414

[51] Int. Cl.⁵ .................................................. A01G 27/00
[52] U.S. Cl. ........................................... 47/79; 47/48.5
[58] Field of Search ............... 47/47, 59, 62, 63, 17, 47/66, 48.5, 79–80, 82

[56] References Cited

U.S. PATENT DOCUMENTS

| | | | |
|---|---|---|---|
| 1,231,976 | 7/1917 | Weitzel, 2nd | 47/79 |
| 3,293,799 | 12/1966 | Keller et al. | 47/48.5 |
| 3,603,034 | 9/1971 | Maxwell-Stewart | 47/79 |
| 4,117,685 | 10/1978 | Skaife | 47/48.5 |
| 4,211,034 | 7/1980 | Piesner | 47/62 |
| 4,248,013 | 2/1981 | Allen | 47/59 |
| 4,315,381 | 2/1982 | Dvorin | 47/59 |
| 4,739,789 | 4/1988 | Hamilton | 47/48.5 |
| 4,920,694 | 5/1990 | Higa | 47/62 |

Primary Examiner—David A. Scherbel
Assistant Examiner—Michele A. Van Patten
Attorney, Agent, or Firm—Bachman & LaPointe

[57] ABSTRACT

A device for maintaining moisture in flower pot stands, having at an inner corner thereof a water reservoir with a floater, and a conduit passing towards the bottom of the flower pot projecting therefrom, this conduit having a plurality of holes and being also covered by gravel upon which the soil for growing plants is placed. Further, axially inside the perforated conduit, there is a metal conduit, also having multiple holes, which may be removed for cleaning purposes, the flower pot stand also having a small tube for controlling water level.

7 Claims, 3 Drawing Sheets

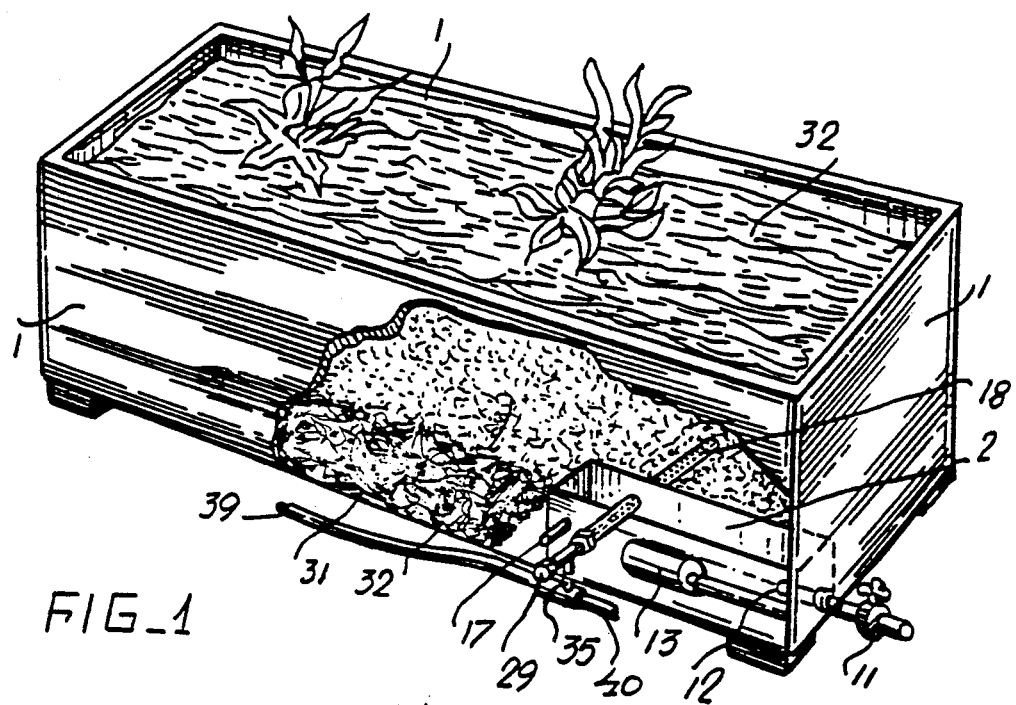
FIG_1
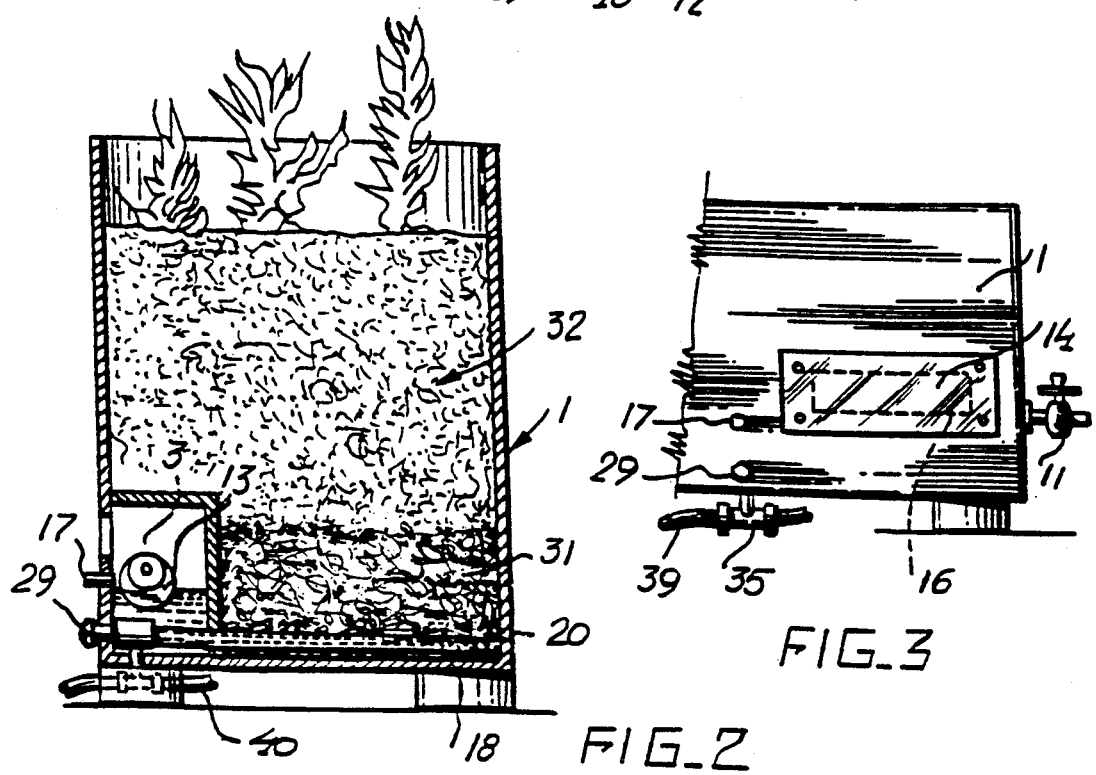
FIG_2
FIG_3

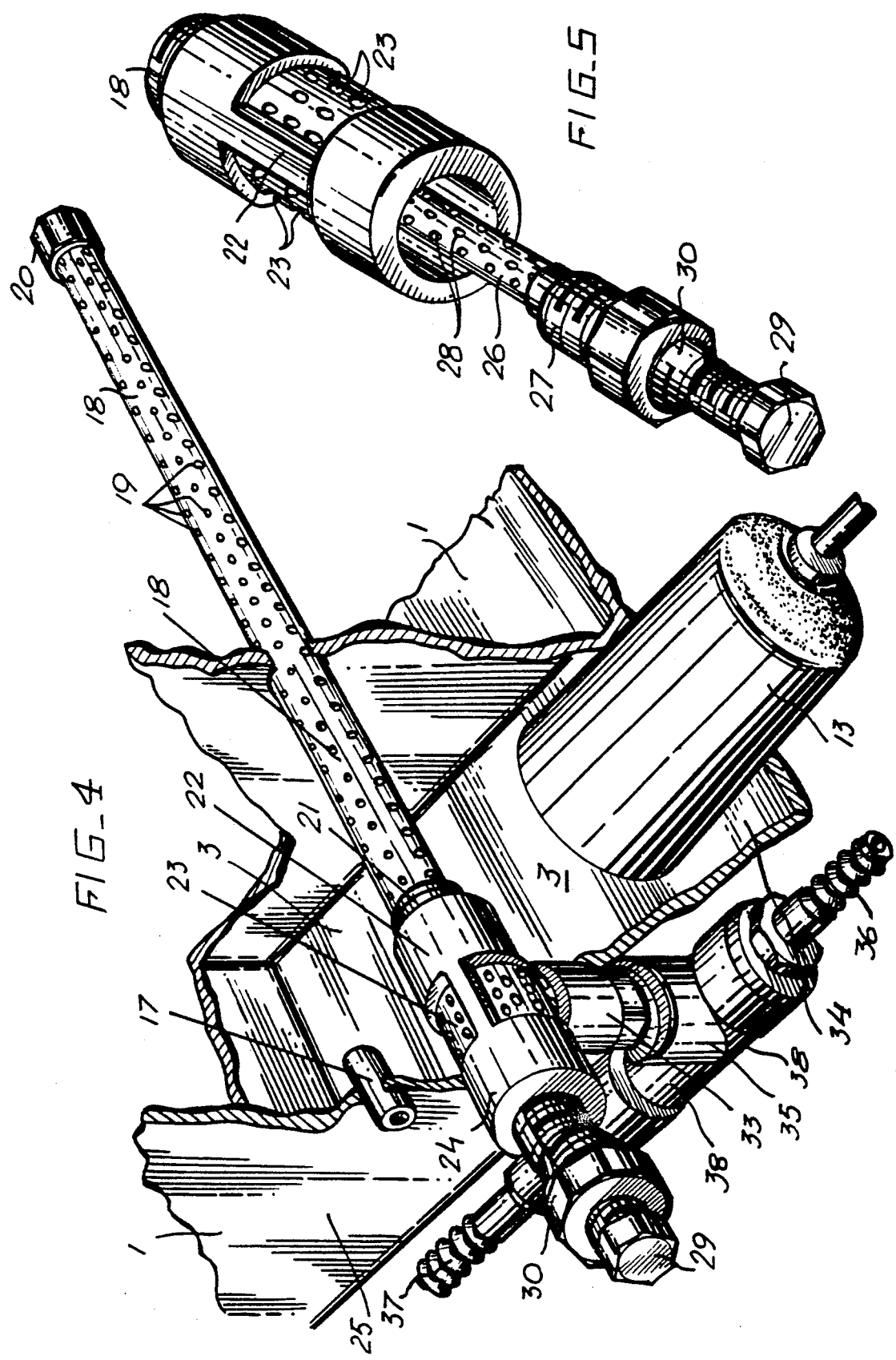

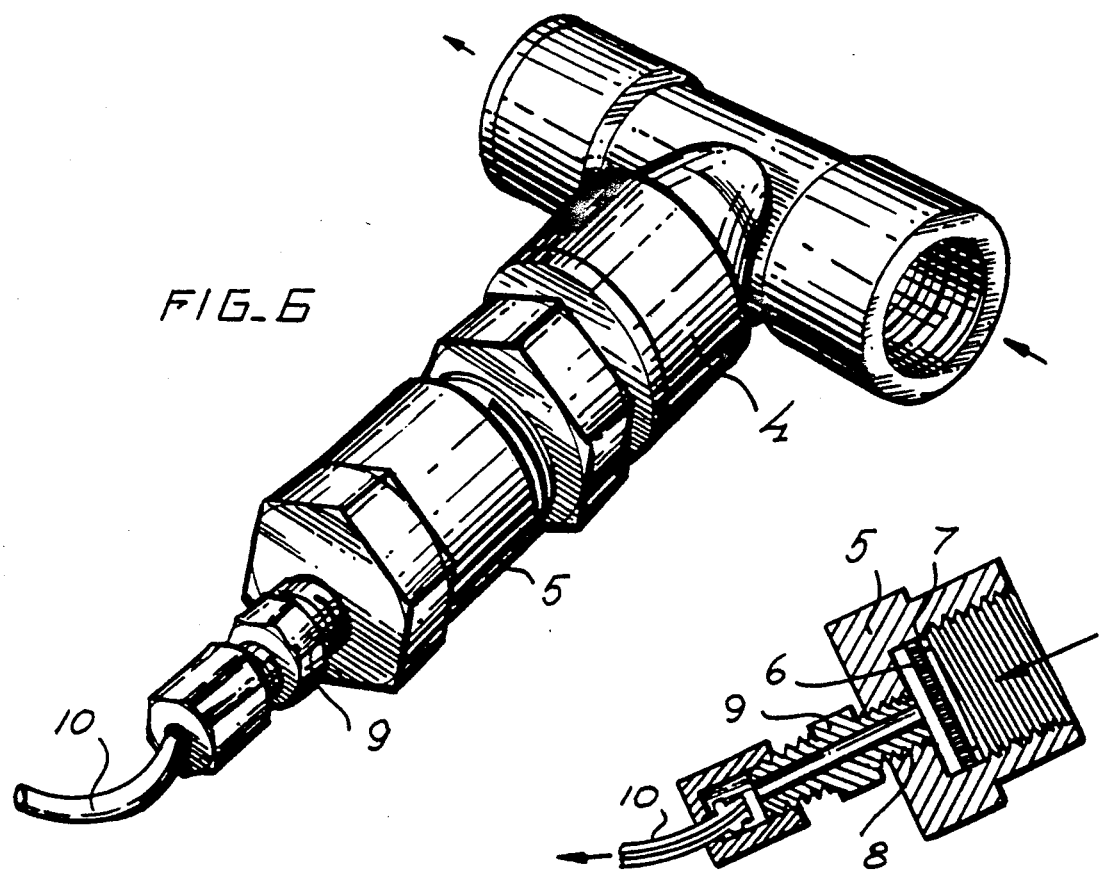
FIG_6
FIG_7
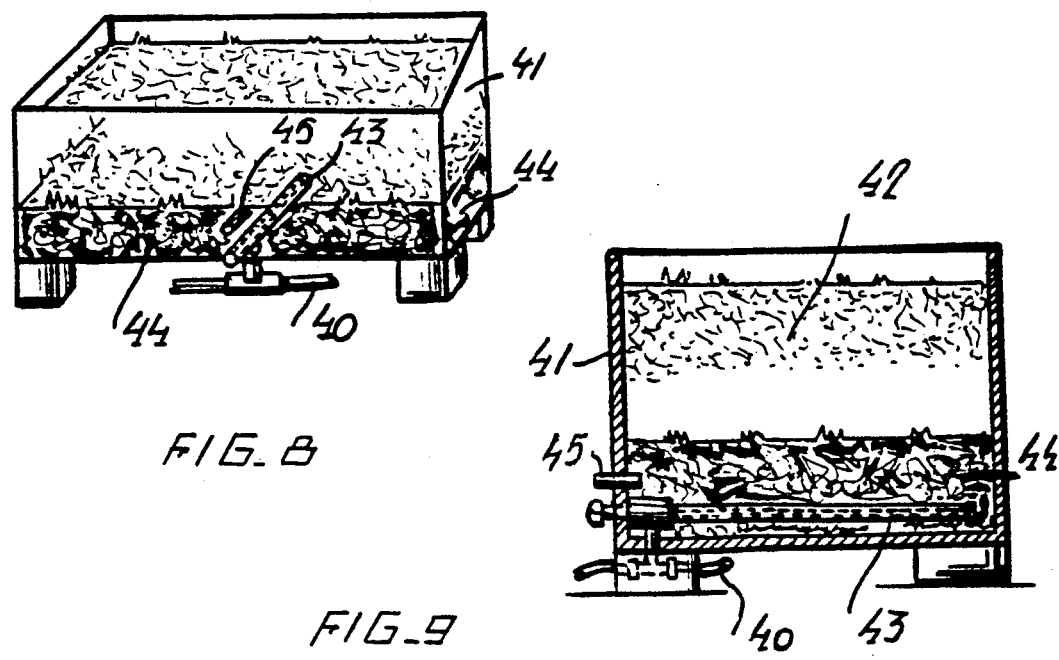
FIG_8
FIG_9

MOISTENING DEVICE FOR FLOWER POT STANDS AND/OR THE LIKE

FIELD OF THE INVENTION

The instant invention refers to a moistening device for flower pot stands and the like. More particularly, it is a novel device that enables supplying numberless flower pots the necessary moisture required permanently by the soil into which plants grow.

PRIOR ART

There are other well-known devices such as, for example, the tray on which water container mouths are placed, locating the flower pots on the projecting surface covered with water. Other embodiment is disclosed in Argentine patent No. 235,647 in which a container with a bent spout (equipped with a textile matchcord, to be dug into the soil functioning by capillarity) is fixed to the flower pot. Another device, disclosed in Argentine patent 237,645, has a water container, including a lid and a tube on which a floating vertical pointer of the water lever acts, by means of a stick. Besides, it has tubes filled up with soil: partially introduced into the water and partly into the soil in order to moisten it.

Argentine patent No. 225,306 discloses a dripping device; No. 225,875 a device watering drop by drop; No. 222,360, in the form of a weir; Nos. 233,249; 232,757; 230,726;, 236,115 and 226,480 disclose automatic watering pumps; in this case the device consists of a mass of water controlled by means of a valve, operated by a floating valve. Said water is covered by an imperforated lid through which flexible tubular bodies (having an absorbent stuff) are passed. The other end is introduced into the earth.

The above prior art has been cited in order to clearly express the differences existing between the above devices and the one of the instant invention.

SUMMARY OF THE INVENTION

The novel device of the invention is used in any flower pot or flower pot stand, whatever its size and/or shape may be, and it is constituted by a small and closed water container, fed through a small and flexible conduit, opaque to light in order to prevent algae formation which may obstruct the passage of water running from a source, prior to passing through a filtering mesh. Said device is located at an inner corner of the pot.

Water is controlled by a valve, actuated by means of a floater; and the level of water inside is checked by means of a small tube connecting the interior of the pot with the exterior thereof, thus exhausting eventual excess of water.

Further, the water container is crossed by a supplying conduit having a plurality of through-holes, having a diameter of 3 mm, extending towards the interior of the flower pot stand and on the bottom thereof.

More precisely, as from the bottom of the flower pot stand, the is a third part of leca filler, porous and light gravel, cooked clay or volcanic lava, etc., passing over the supplying tube which has a plurality of holes, but at a level somewhat lower than that of the small water level control tube, then following the soil for plant development.

In turn, inside the supplying tube bearing a plurality of through-holes, there is a second metal tubular body, also having a plurality of holes of 2.5 mm diameter; this inner conduit is removable and its removal is acomplished from time to time, unthreading it from the portion projecting from the front wall of the flower pot stand, in order to clean it from roots and silt as well as from soil introduced between the two axial tubes, thus avoiding impairing the free passage of water to the container.

In order to supply water to other flower pot stands located at the same level, which also have a supplying tube similar to the above mentioned one, without the inner corner containers, which after a "T" by-pass through the inner floor of the water container, and by means of another threaded "T" by-pass, provides the required water by means of outer opaque flexible conduits, having a diameter of $\frac{1}{4}$", directly through a simple bottom by-pass of other flower pot stands, which as indicated, do not have inner water container, but are provided with the water supplying transversal tube, along with the level control tube, which exhausts excess water when plants are excessively watered.

The valve and the floater always operate in an alternating way, as required by dryness and/or dehydration, in order to recover the moisture required for plants, which are all under the automatic control of the device of the invention.

In this way, all flower pots and/or flower pot stands are under conditions similar to those of natural soil, such as that found at river or lakes margins.

The main object of the device of the invention is providing the required moisture under any weather conditions, during the seasonal year, to the plants involved, from dry surface soils up to the maximum water required in the deep zone, which is attained by the supplying conduit with multiple holes, surrounded at the bottom by gravel.

Moisture goes up to the soil by means of capillarity and through opaque conduits, and several flower pots or flower pot stands may be interconnected following the physical principle of communicating vessels.

Since water is only at the bottom of the container, evaporation is reduced and, consequently, salinity of the soil.

The instant invention allows placing flower stands in rooms as well as on balconies, terraces, etc., with the only requirement of light and running water, without requiring manual watering since the cycle is accomplished automatically and permanently.

Taking into account the above, the instant specification discloses a device completely different to those of the prior art, also in relation to its special constituting parts and operation thereof.

The above and other novel additional objects and advantages of the invention will be apparent to those skilled in the art on the basis of the following detailed description of a preferred embodiment taken in connection with the accompanying drawings.

BRIEF DESCRIPTION OF THE DRAWINGS

FIG. 1 is a perspective view of the device of the invention showing its constitutive elements, with a cross-section of both containers.

FIG. 2 is a cross-section showing the location of the water continer, its floater, the valve and the cock, the supplying tube and its by-passes, gravel and soil.

FIG. 3 shows the cover of the water container, the by-pass from the bottom for supplying other flower pots and the inlet cock.

FIG. 4 is a perspective of the supplying conduit, having a plurality of holes, with its lower by-passes passing through the bottom, and the inner extension feeding water to the gravel surrounding it, the water container, the floater and the conduit for exhausting excess of water.

FIG. 5 is another view of the wafer supplying conduit with the second tube housed axially inside thereof, which is also perforated and partially removed for cleaning.

FIG. 6 shows the by-pass from the running water source, with the essentially opaque supplying conduit of 3 mm diameter, (essentially opaque to light in order to avoid internal vegetation), which carries water after passing through the filter mesh.

FIG. 7 is a cross section showing the filter and retainer ring location, as well as the conduit and threadable head.

FIG. 8 shows a flower pot stand and/or a flower pot at the same level, attached to the main one, receiving water through the by-passes and as this one, many others located in the same way at the same level.

FIG. 9 is a sectional view of a flower pot showing the location of the supplying conduit and the water level control conduit.

DETAILED DESCRIPTION OF THE INVENTION

On the basis of the above, the device of the invention essentially comprises a flower pot and/or container body 1 having at an inner corner 2 thereof a small water reservoir 3.

The water is taken by means of a "T" by-pass 4 having a threaded cap head 5 having a thin filter mesh 6 therein engaged by a retainer ring 7.

A tube 9 is threaded to said threaded cap 5, at its central passage 8, for connecting the end of an essentially opaque flexible conduit, of 3 mm diameter 10 connecting with the cock 11, and the latter with the valve 12 which is actuated by means of floater 13 housed within the reservoir 3.

The reservoir in turn has an opening 14 for inspection, closed by a planar cover 15.

Below the lower edge 16 of the opening 14 there is an exhausting tube 17 through which any excess of water is eliminated.

The water reservoir 3 is crossed by a water supply long tube 18 which has a plurality of through-holes 19 of at least 3 mm diameter, the end being closed by a cover 20.

The opposite end 21 is connected to a "T" by-pass 22, also having through-holes 23, and the axial branch 24 is connected to the front wall 25 of the container 1.

Inside the supplying tube 18 there is, housed axially a second removable metal tube 26, having a thread at its end 27 which has a plurality of through-holes 26 of at least 2.5 mm diameter, which also has a threadable cap at the ends 29 and 30 in order to facilitate cleaning.

At the inner part of the container or pot 1, the supplying conduit 18 is covered by a porous gravel layer 31, of at least a third of its capacity, then followed by the soil layer 32.

The vertical branch 33 of the first "T" by-pass passing through the bottom 34 of the water reservoir 3 is connected to a second "T" by-pass 35 the ends of which, 36 and 37, of the horizontal branch 38 end in connectors for engaging opaque flexible conduits 38 and 40, thus supplying other attached pots located at the same level 41 also having supplying tubes 43 mounted at the inside 42, surrounded with gravel layer 44 and over it the corresponding soil layer, and an exhaust tube 45 having the same location, features, and object of the above mentioned tube.

It is obvious that modifications and/or improvements may be introduced by those skilled in the art, which are to be considered within the scope of the invention as limited by the spirit of the appended claims.

I claim:

1. A device for moistening flower pot stands of a type wherein water is supplied in a capillary manner toward the roots of plants sown into flower pots, said device comprising:

a first flower pot;
   said first flower pot having a water reservoir positioned in a corner thereof;
   a water supply conduit extending between said water reservoir and an internal compartment of said first flower pot, said water supply conduit passing through a wall of said water reservoir and having a plurality of through holes surrounded by porous and light gravel layers;
   a removable, axially extending metal tube positioned within said water supply conduit, said metal tube having a plurality of through holes and being removable to facilitate cleaning of said device;
   means for supplying water to said water reservoir;
   said water supply means comprising a cock communicating with a source of water, valve means associated with said cock for controlling the flow of water into said water reservoir, and float means for operating said valve means;
   said float means being positioned within said water reservoir;
   said water supply means further comprising a cap head communicating with said source of water, said cap head having a threaded inlet and a filter positioned within a compartment in said cap head; and
   a flexible conduit connecting a fluid passage in said cap head with said cock.

2. The device of claim 1 wherein said flexible conduit is opaque to light.

3. A device for moistening flower pot stands of a type wherein water is supplied in a capillary manner toward the roots of plants sown into flower pots, said device comprising:

a first flower pot;
   said first flower pot having a water reservoir positioned in a corner thereof;
   a water supply conduit extending between said water reservoir and an internal compartment of said first flower pot, said water supply conduit passing through a wall of said water reservoir and having a plurality of through holes surrounded by porous and light gravel layers;
   a removable, axially extending metal tube positioned within said water supply conduit, said metal tube having a plurality of through holes and being removable to facilitate cleaning of said device;
   means for connecting said water supply conduit to other flower pots;
   said connecting means comprising a first "T" by-pass connected to a first end of said water supply conduit;
   said first "T" by-pass having a first branch connected to a second "T" by-pass; and flexible conduits connected to said second "T" by-pass, said flexible conduits supplying water to said other flower pots.

4. The device of claim 3 wherein each of said flexible conduits is opaque to light in order to prevent algae formation and has a diameter of at least ½ inch.

5. The device of claim 3 wherein each of said conduits communicates with a supply tube extending within a respective one of said other flower pots.

6. The device of claim 3 wherein said first branch passes through a bottom wall of said first flower pot.

7. A device for moistening flower pot stands of a type wherein water is supplied in a capillary manner toward the roots of plants sown into flower pots, said device comprising:

a first flower pot;

said first flower pot having a relatively small closed water reservoir at a corner thereof;

said water reservoir having an outer side opening closed by a cover and an inlet;

a cock in fluid communication with said inlet;

said cock connected to a closing valve actuated by a float positioned within said water reservoir, said valve controlling the flow of water into said water reservoir;

a first supply conduit horizontally crossing said water reservoir;

said first supply conduit having a plurality of through-holes;

said first supply conduit extending through a wall defining said water reservoir into an internal portion of said first flower pot and further having a first closed end positioned within said internal portion, said first supply conduit within said internal portion being covered with porous and light gravel layers upon which soil to be humidified is located;

said first supply conduit further having a second end opposed to said first closed end;

said first supply conduit being connected to a first "T" by-pass at said second end;

said first "T" by-pass having a series of through holes and an axial branch connected to an outer wall of said first flower pot;

a second supply conduit housed within said first supply conduit, said second supply conduit being formed by a removable metal tube having through holes and a threaded end;

said threaded end of said metal tube being closed by a threaded cap;

said first "T" by-pass further having a vertical branch passing through a bottom wall of said first flower pot;

said vertical branch being connected to a second "T" by-pass;

said second "T" by-pass being connected to two flexible conduits;

said flexible conduits being opaque to light in order to prevent algae formation and being used to supply water to other flower pots located at the same level as said first flower pot;

an exhaust tube for controlling the level of the water in said water reservoir and for exhausting excess water, said exhaust tube being positioned at a level higher than that of said first supply conduit;

a further opaque flexible conduit being connected at a first end to said cock and at a second end to a threaded inlet of a cap head communicating with a running water source; and said cap head having an internal compartment and a thin filter mesh within said compartment, said filter mesh being fixed in place by a retainer ring.

* * * * *